US007553145B2

(12) United States Patent
Nies et al.

(10) Patent No.: US 7,553,145 B2
(45) Date of Patent: Jun. 30, 2009

(54) POWDER PRESS

(75) Inventors: Norbert Nies, Neuss (DE); Walter Solty, Hückelhoven (DE); Bernd Horn, Leipzig (DE)

(73) Assignee: SMS Meer GmbH, Monchengladbach (DE)

( * ) Notice: Subject to any disclaimer, the term of this patent is extended or adjusted under 35 U.S.C. 154(b) by 377 days.

(21) Appl. No.: 11/451,137

(22) Filed: Jun. 12, 2006

(65) Prior Publication Data

US 2006/0286194 A1 Dec. 21, 2006

(30) Foreign Application Priority Data

Jun. 11, 2005 (DE) ....................... 10 2005 027 032

(51) Int. Cl.
*B29C 43/36* (2006.01)

(52) U.S. Cl. ...................... 425/78; 425/575; 425/348 S

(58) Field of Classification Search ................... 425/78, 425/574, 575–577, 589–595, 348–351, DIG. 58
See application file for complete search history.

(56) References Cited

U.S. PATENT DOCUMENTS

| | | | | |
|---|---|---|---|---|
| 3,524,220 | A | 8/1970 | Davison | |
| 5,364,253 | A | 11/1994 | Kojima | |
| 5,455,002 | A | 10/1995 | Kobayashi | |
| 5,498,147 | A | 3/1996 | Katagiri | |
| 5,698,149 | A * | 12/1997 | Hinzmann et al. | 425/353 |
| 5,747,073 | A * | 5/1998 | Pettersson et al. | 425/78 |
| 6,052,842 | A | 4/2000 | He | |
| 7,390,183 | B2 * | 6/2008 | Hinzmann | 425/78 |
| 2002/0044985 | A1 | 4/2002 | Nordell | |

FOREIGN PATENT DOCUMENTS

| | | |
|---|---|---|
| DE | 195 08 952 | 9/1996 |
| DE | 198 30 601 | 3/2000 |
| EP | 0 826 449 | 3/1998 |
| EP | 1 602 473 | 12/2005 |

OTHER PUBLICATIONS

Patent Abstract of Japan; Bd. 1997; Nr. 11; Nov. 1997; JP 09 176701; Toyota Motor Corp.; Forming metallic mold for . . . .
Patent Abstract of Japan; Bd. 2003; Nr. 12; Dec. 2003; JP 2004 291046; Sumitomo Denko Shoketsu; Method and . . . .
Patent Abstract of Japan; Bd. 018; Nr. 243; May 1994; JP 06 031713; Nippon Nuclear Fuel Dev; Manufacture of . . . .

* cited by examiner

*Primary Examiner*—Yogendra Gupta
*Assistant Examiner*—Thu Khanh T Nguyen
(74) *Attorney, Agent, or Firm*—Andrew Wilford

(57) ABSTRACT

A powder press for compacting a compressible mass into a rigid and dimensionally accurate body has a base, a first sleeve part in the base and having an inner surface, and a second sleeve part movable in a predetermined direction on the base adjacent the first die part between an inner position and an outer position. The second part has an inner surface forming in the inner position with the first-part inner surface a cavity open outwardly in the direction. A piston shiftable in the direction in the cavity can compact the mass therein. An actuator can shift the second part in the direction relative to the first part between the inner and outer positions.

8 Claims, 2 Drawing Sheets

POWDER PRESS

FIELD OF THE INVENTION

The present invention relates to a powder press. More particularly this invention concerns an apparatus for compacting a preformed part or mass of powder into a hard and accurately shaped body.

BACKGROUND OF THE INVENTION

Figure 1:
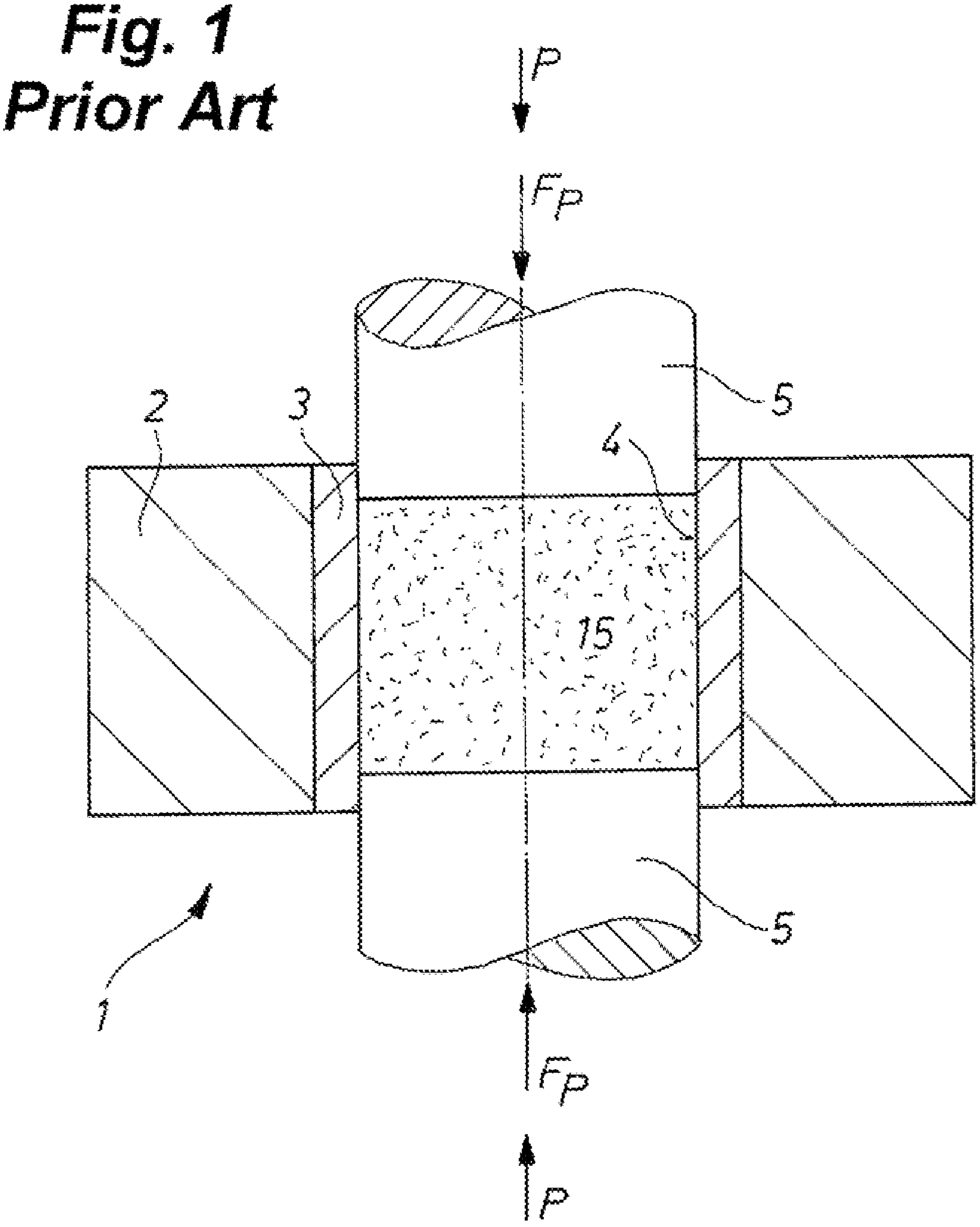
Fig. 1 Prior Art
FIG. 1 is a generic diagram illustrating the prior art.

In order to make a dimensionally accurate rigid body from a mass of powder or other compressible workpiece, for instance formed of a powder-containing paste, a so-called powder press is used. At its most basic such a press 1' has as shown in FIG. 1 a base 2' holding a hard-metal sleeve 3' having a cylindrical inner surface 4' forming a cavity open in at least one direction P', and at least one piston 5' shiftable in the direction P' into the cavity for compacting a mass 15 therein.

By means of a press of this type, it is possible to fabricate shaped workpieces made of metal powder by pressing and subsequent sintering. The use of a piston compressing powder that is introduced into a mold by an axial pressing movement for pressing powder is known. To this end, at least one piston 5' is required that is inserted into the mold. In this case, the mold has a cavity that is opened toward the piston. The mold opening is closed by the piston except for a small clearance. The piston builds up the pressure required for the compression when inserted into the mold cavity.

It is also possible that multiple pistons 5' are provided that can move in one axial direction P'. In this system the pistons 5' can fit into a mold that is axially closed at one side or come from both axial directions in the case of a mold that is axially open in both directions, as shown in FIG. 1. In certain cases, throughgoing mandrel bars that do not primarily fulfill a compression function but rather a displacement function are used. The pistons can also fit laterally into the mold for generating undercuts or other geometrical forms. For removing the shaped workpiece, these pistons that fit in radially are pulled back so that the finished workpiece can be knocked out of the mold.

Generally, the mold consists of a mold base or ring and a mold sleeve inserted thereinto, or respectively sleeve, having the shape of the work piece. A powder press is known from the US 2002/0044985 of Nordell in which there is a press-out portion such that the mold walls that support the press-out channel are increasingly thinner. Due to the thin walls in this area, an increasing flexibility of the tool is achieved that facilitates workpiece removal.

According to the DE 198 30 601 of Hess, a press for powder and granulated material is provided in which two molds whose front faces define the shape of the shaped workpiece enclose an acute angle by means of guides. The surfaces of the front faces of the molds directly abut each other when the final shape of the shaped workpiece is reached.

For fabricating shaped workpieces having an undercut as seen in removal direction of the shaped workpiece a press having a mold and multiple pistons is known from the DE 195 08 952 of Zirkel. Here a segment pusher is used that can be moved also during the pressing operation for the shaped workpiece after the closing of the mold by means of advance and pull-back devices.

For generating the pressing power impacting upon the pistons themselves, it is known from the U.S. Pat. No. 6,539,853 of Hess to provide a device in which a hydraulic element interacts with a piezoactuator for achieving a compact design.

It is generally desirable to achieve a high functionality and variability by means of tool parts that can be moved relative to each other. In this way degrees of freedom in the fabrication of differently shaped workpieces are achieved. Contrary thereto is however the demand for a design of the device that is to be as compact as possible. Each additional press axis required a considerable increase of the tool installation space in the press. Therefore, a retrofitting of existing presses is not possible in most cases.

OBJECTS OF THE INVENTION

It is therefore an object of the present invention to provide an improved powder press.

Another object is the provision of such an improved powder press that overcomes the above-given disadvantages, in particular that is of very compact design and that can even be retrofitted to an existing press.

SUMMARY OF THE INVENTION

A powder press for compacting a compressible mass into a rigid and dimensionally accurate body has according to the invention a base, a first sleeve part in the base and having an inner surface, and a second sleeve part movable in a predetermined direction on the base adjacent the first die part between an inner position and an outer position. The second part has an inner surface forming in the inner position with the first-part inner surface a cavity open outwardly in the direction. A piston shiftable in the direction in the cavity can compact the mass therein. An actuator can shift the second part in the direction relative to the first part between the inner and outer positions.

Unlike in known solutions, the mold sleeve itself is designed such that it can move by means so that powder can be compacted during the pressing operation.

An advanced design provides that the two or more parts of the mold sleeve are concentric to each other and cylindrical. Preferably, one of the sleeve parts is fixed in the base body and the other part can shift in the pressing direction. Furthermore, the first or fixed part body abuts with one portion of its cylindrical outer surface against the cylindrical inner surface of the movable part.

The means for displacing the movable one sleeve part sleeve can be a hydraulic piston-cylinder system. The cylinder of the piston cylinder system therein is advantageously a ring groove in the base of the mold.

According to a design of the invention, one end of the mold sleeve is closed by a plate. In this case, a piston only can be inserted into the mold sleeve on one end. The plate is fixed therein advantageously on the movable part of the mold sleeve.

The piston can consist of multiple hollow cylindrical parts or tubes that are advantageously coaxial. It can also have a rod that is disposed in the center of the nested tubes.

With this design, the mold sleeve is provided with an integrated moving possibility by means of which pressure can be progressively applied to the powder in the mold cavity. Due to the additional press axis that has been created according to the invention, the designing possibility in the fabrication of powder press parts is increased. Furthermore, a major increase of the tool installation space of the press is not necessary, so that a retrofitting of existing installations can be achieved easily.

It is also very advantageous that only a minor lifting movement by means of the piston-cylinder system must be performed for pressing shaped workpieces. In the known solutions, in similar cases mostly the whole mold had to be moved by a lower piston, which is no longer necessary with the system according to the invention.

SPECIFIC DESCRIPTION

Figure 2:
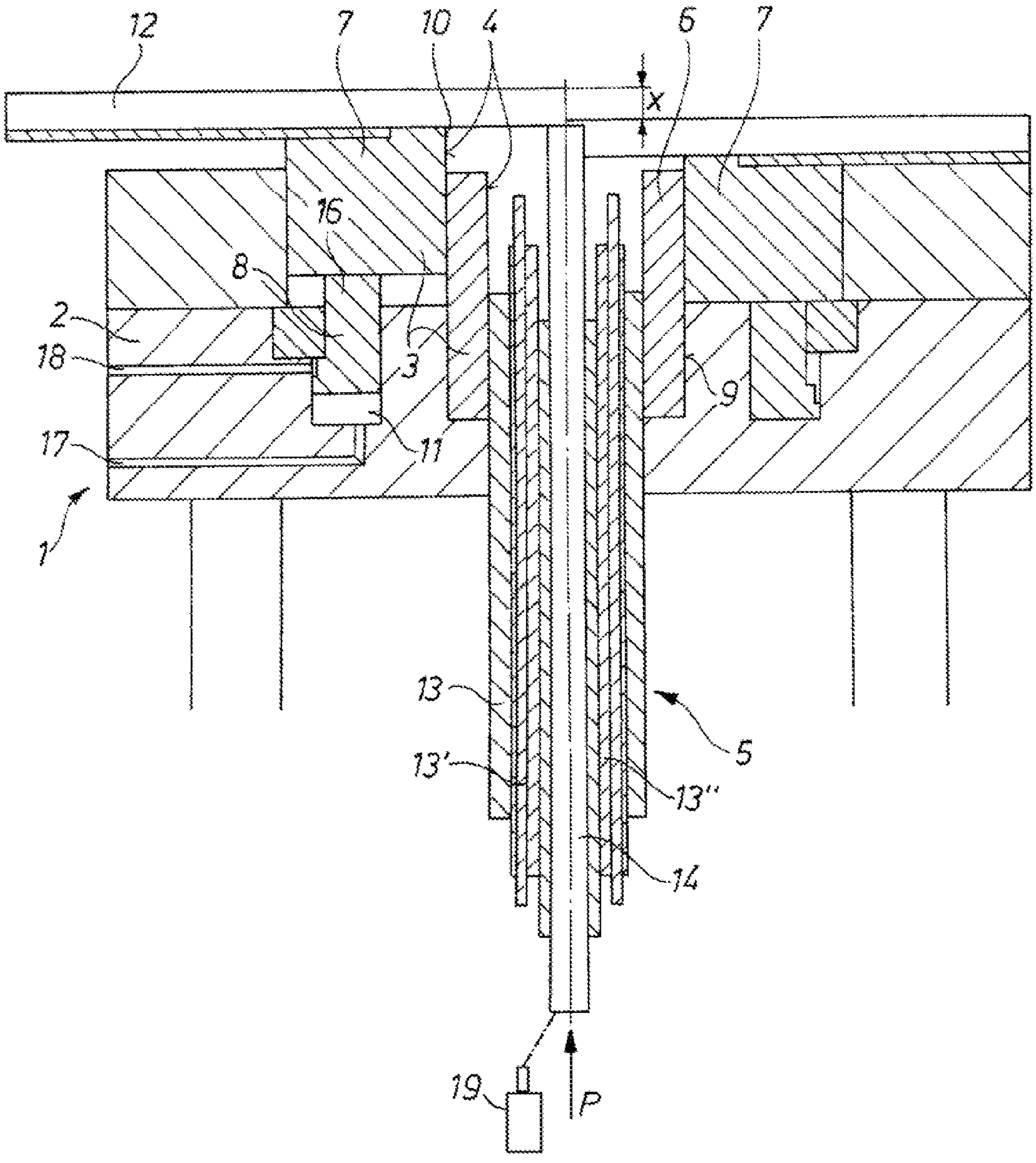
FIG. 2 is an axial section through the press according to the invention.

As seen in FIG. 2, a mold 1 has a base 2 into which a mold sleeve 3 is inserted. The mold sleeve 3 consists of the two parts 6 and 7 that are hollow cylindrical sleeves. Whereas the part 6 is fixed in the base 2, the other part 7 of the mold sleeve 3 is supported relocatable in pressing direction P.

This device is not only suitable for the processing of powder. Often, a workpiece that is already preformed is pressed in a further step, in particular in the final pressing operation with higher pressures that is a particular important application of the device according to the invention and of the respective method.

The two parts 6 and 7 of the mold sleeve 3 define an inner surface 4 that is directed radially inward and that defines the outer shape of the workpiece to be formed. The shape of the workpiece is moreover determined by a plate 12 that is disposed at the front face on the movable part 7 of the mold sleeve 3. Furthermore, its shape results from the piston 5 being pushed into the mold sleeve 3 from the bottom.

The piston 5 consists in the example of embodiment of multiple tubes 13, 13', and 13" that are fitted coaxially together and whose relative axial positions create the shape of the finished workpiece. The tubes 13, 13', and 13" coaxially surround a center rod 14 that can be shifted axially independent of them. The piston 5 is moved axially by an actuator shown schematically at 19 and exerting a pressing force FP.

On the left side of the view of FIG. 2, the part 7 of the mold sleeve 3 is shown moved to the top end position, whereas on the right side, the part 7 has been moved to the bottom end position.

As can be seen further, the movable part 7 of the mold sleeve 3 encloses the cylindrical outer surface 9 of the part 6 that is disposed stationary in the mold sleeve 3 with a cylindrical inner surface 10. Both interacting surfaces 9 and 10 are fitted that relative sliding of the parts 6 and 7 is possible, the gap between both them being as small as possible.

The movement of the movable part 7 of the mold sleeve 3 relative to the fixed part 6 is achieved by means 8 that are designed as hydraulic piston-cylinder system. More particularly, an annular groove 11 is formed in the base 2 of the mold 1 that has the function of a cylinder for an annular piston 16. The cylinder 11 is connected to two fluid conduits 17 and 18 by means of which it is possible to introduce hydraulic oil into the cylinder cavity in a regulated or respectively controlled manner for moving the piston 16 into the desired relative position to the cylinder 11 in a regulated or respectively controlled manner. Thus the piston 16 and cylinder 11 are double-acting.

The maximum displacement of the part 7 relative to the part 6 of the mold sleeve 3 is indicated at x.

Whereas the use of the device according to the invention and the related method is indicated in the case of shaped workpieces that have a cylindrical part at least on a portion, the invention can as well be applied if this is not the case, i.e. if the shaped workpiece is not cylindrical, not even on a portion thereof, and the mold sleeve consequently has no portion that is cylindrical.

We claim:

1. A powder press for compacting a compressible mass into a rigid and dimensionally accurate body, the press comprising:

a base;

a first sleeve part in the base and having an inner surface;

a second sleeve part movable in a predetermined direction on the base adjacent the first die part between an inner position and an outer position, the second part having an inner surface forming in the inner position with the first-part inner surface a cavity open outwardly in the direction;

a piston shiftable in the direction in the cavity for compacting the mass therein;

actuator means for shifting the second part in the direction relative to the first part between the inner and outer positions; and a plate on the base overlying an open side of the cavity and fixed to the second sleeve part.

2. The powder press defined in claim 1 wherein the inner surfaces of the first and second sleeve parts are cylindrical and both centered on a common axis extending parallel to the direction.

3. The powder press defined in claim 2 wherein the first part is fixed in the base.

4. The powder press defined in claim 3 wherein the first sleeve part has a cylindrical outer surface fitting and slidable in the inner surface of the second sleeve part.

5. The powder press defined in claim 1 wherein the actuator means includes a hydraulic piston.

6. The powder press defined in claim 5 wherein the base is formed with a chamber in which the piston is shiftable in the direction, the actuator means including means for pressurizing the chamber.

7. The powder press defined in claim 1 wherein the piston is formed by a plurality of concentric tubes.

8. The powder press defined in claim 7 wherein the piston has a central rod shiftable relative to the tubes.

* * * * *